Oct. 17, 1939.  J. E. McLAUGHLIN  2,176,504
PIPE COUPLING DETACHABLE LOCKING DEVICE
Filed July 18, 1938
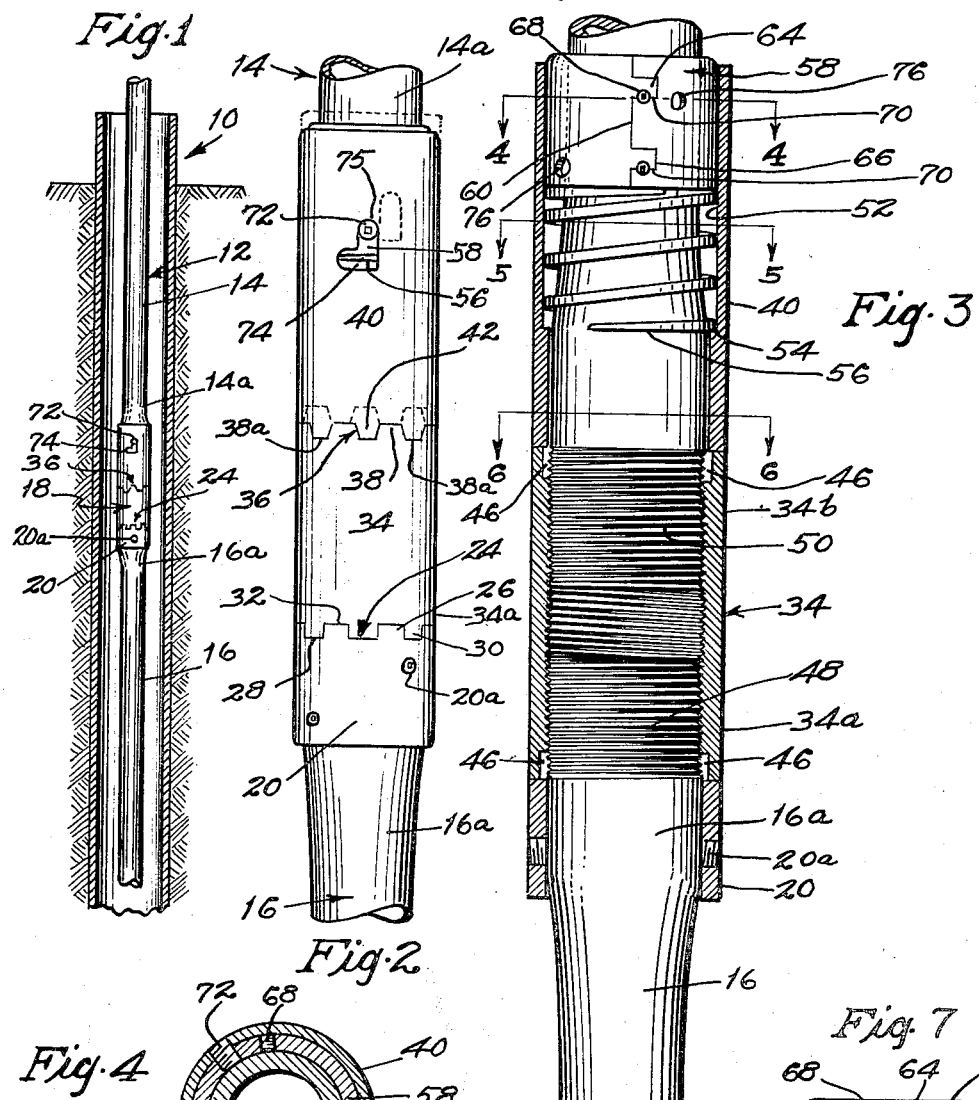
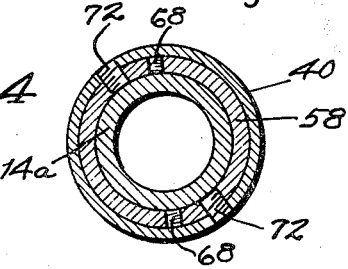
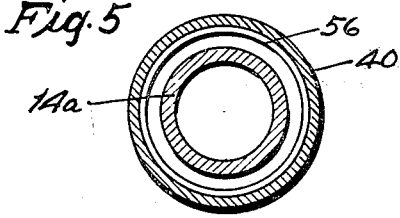
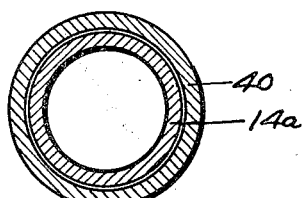
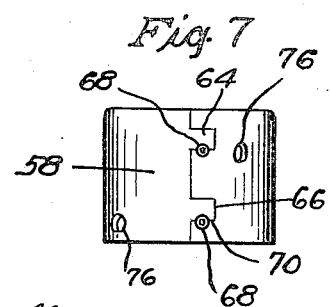
INVENTOR.
James E. McLaughlin
BY
Robt. L. Woolsey
ATTORNEY Patented Oct. 17, 1939

2,176,504

UNITED STATES PATENT OFFICE 2,176,504

PIPE COUPLING DETACHABLE LOCKING DEVICE

James E. McLaughlin, Piru, Calif.

Application July 18, 1938, Serial No. 219,744

4 Claims. (Cl. 285—146)

The device of this invention relates to means to detachably lock the adjoining ends of flow pipe or drill pipe or other lengths which are normally in threaded union, whereby the ends of such members are joined in such manner as to prevent their accidental dislocation.

It is frequently found in oil wells employing great lengths of flow pipe, that due to vibration of the upwardly flowing oil, as well as due to the movement of the sucker rod in actuating the well pump, that vibration of varying degrees of intensity frequently causes certain of the joints of such pipe or tubing to become loosened to an extent sufficient to permit the escape of quantities of oil therefrom, which oil returning to the pump between the flow pipe and the casing is again pumped upwardly to again be lost in part or whole by escape through the loosened flow pipe connection. In extreme cases such flow pipe may become entirely loosened from its next or subadjacent length, and it goes without saying, that when such a situation arises, it necessitates great expense in time and money to rejoin the ends of the said separated flow pipe.

However, even though such flow pipe is not entirely disjoined, but merely dislocated to the extent of leakage, great inefficiency results from the idle recirculation of endless quantities of oil which would otherwise have been raised to the surface in the form of useful production.

In view of the foregoing, it is a prime object of the present invention to provide a simple, yet practical means to join the ends of a flow pipe or other tubing or piping in such manner that adjoining ends thereof are held in locked relation, yet in such manner as to enable the said tubing to be disengaged by application of pressure by apparatus upon the surface of the earth.

A further object of the invention is to provide a detachable or disengageable locking means for flow pipe which will prevent loosening of the joints thereof by reason of vibration resulting from the flow of fluid or by vibration setup by movement of the well pump's sucker rod.

Another object of the invention is to provide a simple, reliable, rugged, and relatively low cost disengageable locking device for tubing for the purposes stated.

Other objects, features, and advantages of the invention may appear from the accompanying drawing, the specification, and the subjoined claims.

In the drawing of which there is one sheet:

Figure 1 is a utility view showing in fragment, a well having a flow pipe employing the device of this invention as a locking means to join the adjoining ends of pipe.

Figure 2 is a side elevation of the flow pipe locking means of this invention.

Figure 3 is a view partially in section showing construction used in building the detachable lock of this invention.

Figure 4 is a plan view in section taken on line 4—4, in Figure 3.

Figure 5 is a plan view in section taken on line 5—5, in Figure 3.

Figure 6 is a plan view in section taken on line 6—6, in Figure 3.

Figure 7 is a side elevation of a disengageable collar adapted to be secured upon the flow pipe, the collar being adapted to form an abutment for spring means to hold certain of the member parts of this invention in operative engagement.

In the drawing the reference character 10 indicated a well having a flow pipe 12 formed of a plural number of sections 14 and 16, the adjacent ends of which are held in detachable locked engagement by means of the device 18 of this invention. Oil wells or other wells of considerable depth employ many of the sections or lengths 14 and 16, but for the purpose of the illustration, but two of such sections have been shown, additional sections would of course be merely repetitious of the instant showing.

As shown in Figures 2 to 7 inclusive, the device 18 comprises the base member 20 which is secured to the end 16a of pipe length 16 by means of set-screws 22 which are flush with or countersunk in the base member whereby it is removed from engagement with other parts of the well and associated apparatus when being raised or lowered with respect to the well 10.

The member 20 is provided with an interlocking edge 24 which comprises square tongues 26 and rectangular recesses 28, which are adapted to be brought into matched engagement with rectangular tongues and recesses 30 and 32 formed in the threaded sleeve 34, the end 34a of which is in threaded engagement with the end 16a of flow pipe 16.

The end 34b of the sleeve 34 is also provided with an inter-locking edge 36 which differs from the edge 24 in that the tongues 38 are formed with inclined sides or edges of such degree of angular inclination as to be relatively withdrawable from recesses 38a formed in the cylindrical member 40. Tongues 42 having an identical configuration to that of tongue 38, extend from the member 40 and are adapted to rest in nested relation with recesses 38a.

The tongues 26, 30, 38, and 42 have part of their stock cut-away as shown at 46 in Figure 3 in order to provide clearance of the threads 48 and 50 on pipes 14 and 16 when the inter-locking edges 24 and 36 are brought into engagement.

The inner wall 52 of the member 40 is cut away at 54 to provide a rest for an extensile spring 56, the opposite end of which is in abutment with a split collar 58.

The collar 58 is provided with an interlocking joint 60, formed of alternating tongues and recesses 64 and 66.

Set-screws 68 threadedly positioned upon the line 70 of cleavage between the halves of the collar 58. The collar is relatively adjustable upon the end 14a of pipe 14, and is held in position by means of set-screws 72 which are loosely positioned in substantially reversed L shaped slots 74 formed in the cylindrical member 40, and extend inwardly through and in threaded engagement with the split collar 58 through openings 76 and abut the end 14a of pipe length 14.

The foregoing description of construction employed in the device of this invention is conclusive, reference will now be made to the description of operation.

Of the member parts which comprise the device of this invention, the base member 20 may be said to be first slipped over the end 16a of pipe length 16. The threaded sleeve 34 is then turned upon the threaded end of length 16 until a good and sufficient threaded connection has been established therebetween. Pipe length 14 is then threaded into the sleeve 34 until it is also in good and sufficient connection therewith.

The cylindrical member 40, having the extensile spring 56 therein, is then slipped down over the end 14a of pipe 14 and is rotated until the interlocking edge 36 is brought into matched engagement. The halves of the split collar 58 are then laid upon the end 14a and are joined by means of set-screws 68 thereby locking the half collars into a unitary structure, which is then forced downwardly upon the spring 56 until the upper extremity 75 of slot 74 is brought into alignment therewith. Set-screws 72 are then inserted until they are brought into positive engagement with the pipe 14. The base member 20 is then moved upwardly until the interlocking edge 24 is brought into matched engagement, one part with the other, the set-screws 20a are then tightened until the base member is in fixed position.

The foregoing description of the assembly of the device now brings us to the operation of the same, which is as follows.

Assembly of the device as aforestated, will definitely hold the pipes 16 and 14 in fixed relation against such minor sources of vibration as flowing fluids, and sucker-rod movement, by reason of the fact that the member 34 which is analogous of a common pipe collar, is held in fixed position by means of the base member 20 and the interlocking edge 24, for the set-screws 20a afford sufficient grip upon pipe 16 to hold the member 20 even though there might be a tendency for the sleeve (collar) to turn. The cylindrical member 40 is fixedly joined with the pipe 14 by reason of the split collar 58 and the set-screws 72 which are in abutment with the pipe 14, and since the interlocking edge 36 brings the member 40 and sleeve 34 into non-rotatable relation, the pipe 14 cannot rotate until and unless the interlocking edge 36 becomes disengaged, and parts are moved to the position shown in dotted lines 40a.

The inclined faces between the tongues and recesses employed in the interlocking edge 36 enables the pipe lengths 14 and 16 to be disengaged if power is applied thereto, but it has been found that the type of vibration found to exist in flow pipes after installation, are never of sufficient magnitude to cause a dislocation of the interlocking edge 36, and hence are never sufficient to cause such a break in the pipe connections as to enable oil to flow therethrough.

While I have shown and described the preferred form of my invention, I do not wish to be limited to the specific showing herein made, but do claim as a part of this invention, all such near resemblance, of principle and mode of operation as clearly falls within the scope of the invention as set forth in the following appended claims.

I claim:

1. A flow pipe coupling comprising a sleeve adapted to join adjacent ends of an upper and lower pipe in threaded union, a collar fixedly secured upon the upper end of the lower of said pipes and being in matched serrated edge engagement with said sleeve, a second collar, said second collar being fixedly secured upon and adjacent the lower end of the upper of said pipes and being provided with pins projecting therefrom, a second sleeve, said last mentioned sleeve being positioned over said second mentioned collar and over the lower portion of said upper pipe and being in matched tongue and recess engagement with said first mentioned sleeve, said second mentioned sleeve being provided with slots to receive said pins to permit longitudinal movement thereof, and spring means to normally secure said last mentioned sleeve in non-movable position.

2. A flow pipe coupling comprising a sleeve adapted to join adjacent ends of a first and a second length of flow pipe, a collar fixedly secured upon said second pipe and being in matched serrated edge engagement with said sleeve, a collar fixedly secured upon said first pipe, a second sleeve, said second sleeve being placed over said last mentioned collar and being in matched tongue and recess engagement with said first mentioned sleeve, said second mentioned sleeve being provided with slots, pins projecting from said second mentioned collar and being adapted for relative movement within said slots whereby the sleeve may be moved longitudinally upon said first pipe, and a spring to normally urge said second sleeve into union with said first mentioned sleeve, said slots being formed with a recess to receive said pins whereby said second mentioned sleeve may be held in disjoined relation to said first mentioned sleeve.

3. In a flow pipe coupling, a sleeve in threaded union with adjacent ends of a first and a second flow pipe, a collar upon said second pipe to lock said sleeve relative thereto, a collar upon said first pipe, a second sleeve, said second sleeve being fitted over said second collar and said first pipe and being provided with an annular flange upon the inner side thereof, matched tongues and recesses in said sleeves whereby they may be held in disengageable union, a spring encircling said first pipe and being under compression between said second collar and said annular flange whereby said sleeves may be forced into engagement, pins projecting from said collars, longitudinally and transversely directed slots in said second sleeve to receive said pins whereby said second sleeve will move longitudinally of said pipe and subsequently be held in disengaged relation with said first sleeve upon application of rotational pressure to said first pipe.

4. A detachable lock for two flow pipe sections comprising in combination with such pipe, a sleeve joining said pipe sections in threaded connection and being provided in its one end with tongue and recess configuration, a collar fixedly secured upon one of said pipe sections, a second sleeve, said second sleeve having slots and being slidably positioned over said collar and being provided with tongue and recess configuration adapted to be in mesh with that of said first mentioned sleeve, a spring operatively positioned within said second sleeve to force the same into said tongue and recess engagement, pins projecting from said collar and adapted to move through said slots upon application of tension and then torsional pressure whereby said second sleeve will be disengaged from said first sleeve and held in said disengaged position.

JAMES E. McLAUGHLIN.